Figure 1:
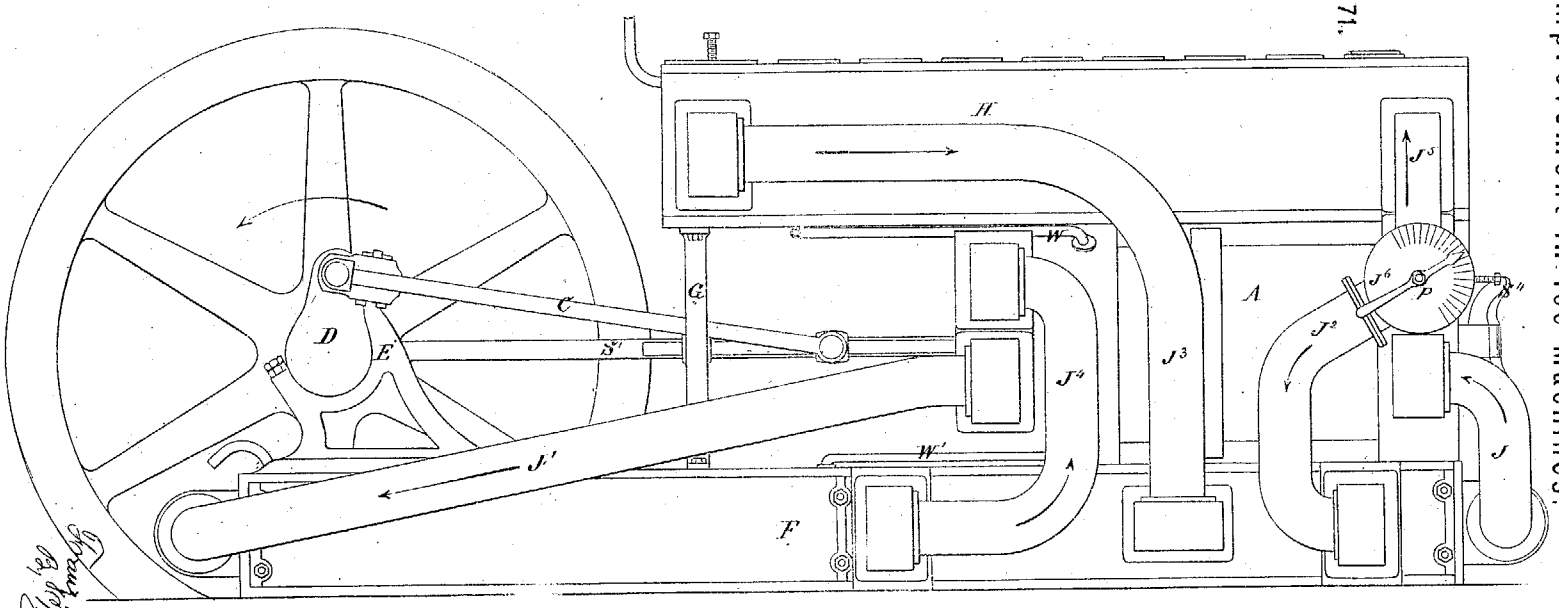

FRANZ WINDHAUSEN. 4 Sheets--Sheet 1.

Improvement in Ice Machines.

No. 4,603.

Reissued Oct. 17, 1871.

Witnesses.

F. A. Jackson

Edmund Masson

Inventor

Franz Windhausen

By Munn & Co. Attys.

FRANZ WINDHAUSEN.

Improvement in Ice Machines.

4 Sheets--Sheet 2.

No. 4,603.

Reissued Oct. 17, 1871.

Witnesses.

F. A. Jackson

Edmund Masson

Inventor.

Franz Windhausen

By Munn & Co. Attys.

FRANZ WINDHAUSEN. 4 Sheets—Sheet 3.

Improvement in Ice Machines.

No. 4,603.

Reissued Oct. 17, 1871.

Witnesses

F. A. Jackson

Edmund Masson

Inventor.

Franz Windhausen

By Mm. C. Ward Atty.

4 Sheets--Sheet 4.

FRANZ WINDHAUSEN.

Improvement in Ice Machines.

No. 4,603. Reissued Oct. 17, 1871.

Witnesses.
F. A. Jackson
Edmund Masson.

Inventor.
Franz Windhausen
By McLeod & Wood Atty.

UNITED STATES PATENT OFFICE.

FRANZ WINDHAUSEN, OF BRUNSWICK, GERMANY, ASSIGNOR TO LOUIS SCHNEIDER, CHRISTIAN T. BUDDECKE, AND JOHN A. BLAFFER, OF NEW ORLEANS, LOUISIANA.

IMPROVEMENT IN ICE-MACHINES.

Specification forming part of Letters Patent No. 101,198, dated March 22, 1870; reissue No. 4,603, dated October 17, 1871.

*To all whom it may concern:*

Be it known that I, FRANZ WINDHAUSEN, of the city of Brunswick, Germany, have invented certain new and useful Improvements in Machines for Making Ice, which are also applicable to other freezing and cooling operations; and I do hereby declare that the following is a full, clear, and exact description of the same, reference being had the accompanying drawing.

This invention relates to that class of freezing and ice-making machines in which atmospheric air is compressed, then passed through a cooler, and afterward expanded again to remove the heat—or, in other words, to produce cold—but which machines have hitherto been limited in their cold-producing properties by the degree of expansion to which the air is subjected, and by the temperature of the cooling water employed. The invention has for its object the construction of a machine of small compass, which, with one constant degree of expansion of the air employed, produces any requisite degree of cold, and which degree of cold can be regulated to the greatest nicety by the hand of the attendant by means of graduated adjusting-valve mechanism. For the purpose of my invention I employ a single double-acting cylinder, being capable of compressing the air in the chamber formed on one side of the piston, and of expanding it in the chamber formed on the other side; or, when two cylinders are employed, one is used for compressing the air and the other for expanding it afterward. The air is at first admitted into the compressing-chamber, and thence, for the purpose of being cooled, passes into a cooler, which forms a material part of the invention, and which is composed of two distinct compartments, one of which is cooled by air and the other by a constant flow of cold water. From this cooler it passes into the expansion-chamber, in which it is expanded and cooled, and whence it escapes through a temperature-regulator of peculiar construction into the refrigerator, in which the vessels are situated which contain the liquid to be frozen; or pipes are arranged through which air, gases, or vapors may pass for the purpose of being cooled. By means of the temperature-regulator above mentioned a portion of the air proceeding from the expansion-chamber may be admitted into the cooler before mentioned for the purpose of cooling one compartment thereof, and when the cold air admitted into the refrigerator has become heated to such a degree as to be of no further service there, but is still at a low temperature, it passes through this compartment of the cooler for the same purpose on its way to the compressing-chamber, and may, previously to entering the compressing-chamber, be made to pass through one or more pipes surrounded by the running stream of cooling water, which afterward passes through the other compartment of the cooler, and thus may have a cooling effect upon such water. Having thus circulated through the machine, the same air is again admitted into the compressing-chamber, and the whole operation is repeated, thus keeping up a continuous circulation through the machine. The cylinders are fitted with induction and eduction-valves, worked by eccentrics or tappets on the crank-shaft, which latter is connected to the piston so as to be worked either by power or by hand. In order to maintain an equal pressure of air in the refrigerator and condenser an expansion-chamber is requisite in connection therewith to serve as a pressure-regulator. I have therefore presented such a chamber, suitably connected in the form of a balloon, made of vulcanized India rubber or other suitable elastic material, in communication with the interior of the refrigerator, which regulator stretches out when the pressure in the refrigerator is greater than that of the atmosphere, and is contracted as soon as the pressure in the refrigerator is less than that of the atmosphere. It is also desirable, should any deficiency of air occur in the refrigerator, that it be supplied automatically, and also that the air so admitted be chilled during its induction; therefore the refrigerator is further provided with a valve opening inward, which is acted upon by the atmosphere, and supplies any loss of air in the machine. Between the valve-opening and the interior of the refrigerator is an ante-chamber with perforated sides, through which the air is drawn.

In order that my invention may be more readily understood, I have hereunto annexed a drawing of an ice-making or freezing-machine, having only one double-acting cylinder, in which the expansion of the air employed takes place, drawn to the scale of about one inch to the foot.

Figure 2:
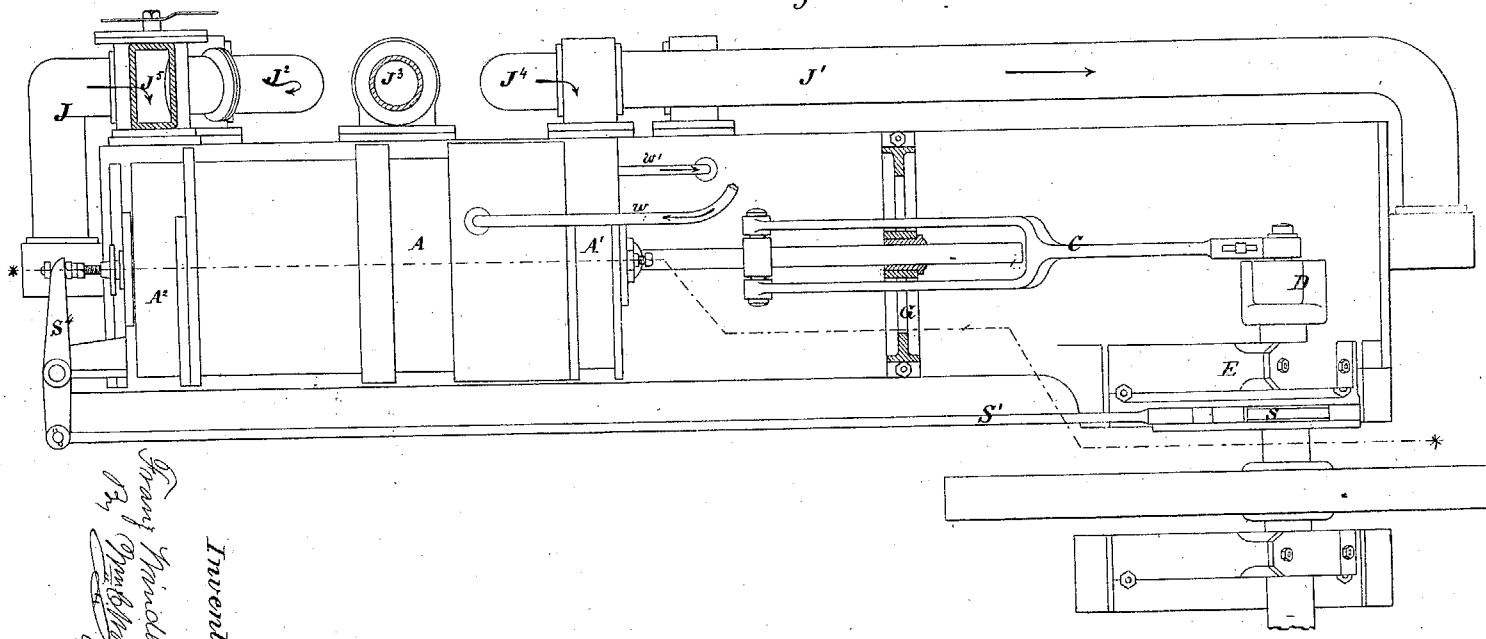
Figure 3:
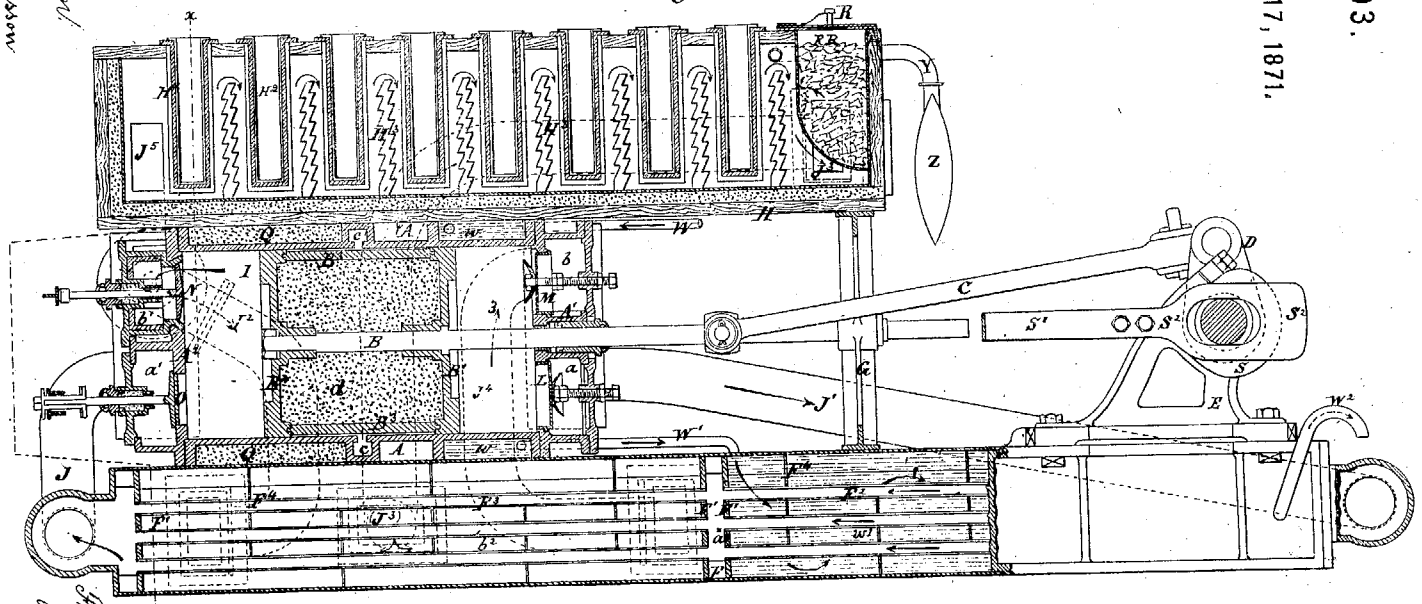
Figure 4:
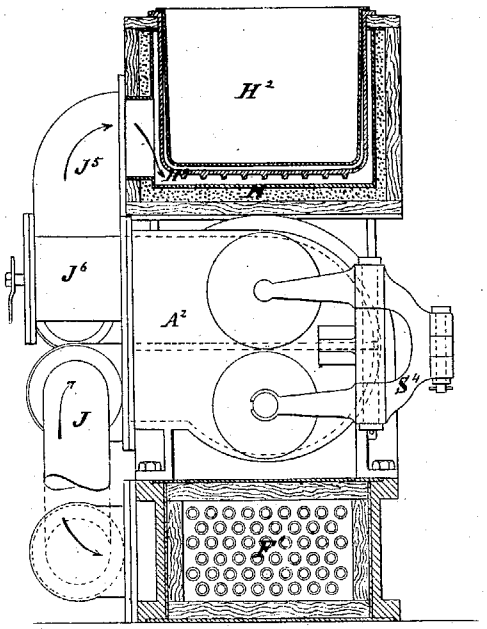

Figure 1 is a side elevation of the machine, and Fig. 2 a plan of the same with the refrigerator removed in order to show the cylinder and arrangement of pipes more clearly. Fig. 3 is a longitudinal vertical section of the machine through the line * *, shown on Fig. 2; and Fig. 4 is a back view, seen in section along the line *x x*, marked on Fig. 3.

Similar letters are used to denote similar parts in all the views.

A is the double-acting cylinder, and B the piston of the same, which, by means of the forked connecting-rod C, is connected to the crank D of the driving-shaft, which carries the fly-wheel and revolves in one of its bearings on the pedestal E, which pedestal and the cylinder are situated and screwed upon the cooler F. The cooler F consists of a rectangular inclosed chamber, containing a series of parallel pipes, more particularly described hereafter. Situated on the top of the cylinder A, and partly supported by a pillar, G, is a fixed refrigerator, H. This is a rectangular double-cased chamber, in which are suspended the cases $H^1$ and $H^2$, which contain the liquid or other medium to be cooled. All the internal parts of the machine communicate with each other by the pipes $J^1$ and $J^2$ and valves L, M, N, and O. The cylinder A is fitted with heads $A^1$ and $A^2$, each of which is formed hollow and divided, as shown, by a partition into two compartments, the compartments of the cover $A^1$ being marked *a* and *b*, and those of the head $A^2$ being marked $a^1$ and $b^1$. These compartments communicate with the interior of the cylinder at its respective ends, by passages fitted with valves, L being the outlet-valve, M the inlet-valve appertaining to the compartments *a* and *b*, and O being the inlet-valve, and N the outlet-valve appertaining to the compartments $a^1$ and $b^1$. The front part 3 of the cylinder, in which the compression takes place, is surrounded, as shown in Fig. 3, by a jacket, W, containing water to cool it, and the back part, 1, or other end of the cylinder in which the expansion takes place is enveloped in a non-conductor of heat, Q, by preference composed of sawdust or loose cotton, in order to prevent it as much as possible from being heated from the outside. *c* is an annular passage or space surrounding the cylinder, and separating the front from the back part of the cylinder, in order to prevent the heat being carried from the front to the back. This space *c* serves at the same time as a receptacle for the grease to lubricate the piston. The piston B is nearly as thick as the whole length of the stroke of the crank D, and is constructed of two disk-plates, B and $B^2$, affixed to the piston-rod, and each of which plates is fitted with the ordinary cupped leathers. The intermediate space between such plates is filled with a non-conductor of heat, by preference of loose cotton, and surrounded on the outside by a wooden casing, $B^3$, for preventing the heat from being conducted from the front to the back part of the cylinder. The piston-rod passes through a stuffing-box, and is guided through a bush fitted in the pillar G. The actuating mechanism of the valves N and O consists of a cam or tappet-wheel, S, keyed upon the driving-shaft, which alternately strikes the friction or tappet-rollers $S^2$, mounted in a yoke upon the rod $S^1$, according to the expansion in the back part of the cylinder. The rod $S^1$ is connected to the forked lever $S^4$, the ends of which lever actuate the spindles of the valves O and N, as illustrated, in such a manner that the valve O allows the compressed air to enter the back part of the cylinder for a portion of the forward stroke of the piston, until the valve O closes, when the expansion takes place for the remaining portion of the stroke. During the back-stroke of the piston the valve N is arranged to remain open by the disposition of the cams or tappet-wheels S upon the driving-shaft. The valves L and M in the cylinder-head $A^1$ are self-acting, like ordinary pump-valves. The cooler F consists of a hollow inclosed box or chamber, which, at the same time, constitutes the foundation or bed-plate, upon which the cylinder A, pedestal E, and refrigerator H are fixed. Its interior is divided, by the space $a^*$, into two compartments, $w^1$ and $b^2$, hermetically closed. In each of these compartments a series of parallel pipes, $F^2$ and $F^3$, are fixed, being secured in the ends $F^1$. The interiors of these pipes are in communication with each other through the space $a^*$, and with the space *a* of the front cylinder-head through the pipe $J^1$, and with the space $a^1$ of the back cylinder-head through the pipe J. The space $w^1$ surrounding the outside of the first series of parallel pipes is entirely filled with a running stream of water, which flows away through the pipe $W^2$, the fresh supply being kept up by means of any ordinary pump, which supply enters by the pipe W and passes through the jacket *w*, surrounding the front part of the cylinder, before it enters the space $w^1$ through the pipe $W^1$. In order to keep this water in direct contact with the outside of all the cooling-pipes, the metal plates $F^4$ are fixed in the compartment $w^1$, so as to compel the water to pass by or in contact with the outside of every single pipe, and by this means the water is caused to pass through in an opposite direction to the current of air which passes through the interior of such pipes, and thus cools the air passing through them to the lowest degree with the smallest quantity of cooling water. The other division or compartment of the cooler F, marked $b^2$, is similar to that just described, with this difference, that the pipes in this compartment are surrounded by a current of cool air instead of water. This cold air enters through the pipe $J^2$, direct from the compartment $b^1$ of the back cylinder-head, and also from the refrigerator H, through the pipe $J^3$, and proceeds in the direction of the arrows through the pipe $J^4$, to the compartment *b* of the front cylinder-head, whence it is drawn through the inlet-valve M, by means of the piston, into the front part of the cylinder, to be again compressed at the return stroke of the piston, and afterward driven into the cooling-pipes through the outlet-valve L and pipe $J^1$. This refrigerator has already been described as being fixed upon the cylinder and pillar G, and consisting of a double-cased rectangular chamber H, constructed of wood, the space between the casings being filled with a non-conductor of heat, by preference loose cotton. The cover of this refrigerator has rectangular openings formed in it for the corresponding rectangular metal cases $H^1$, which are opened at the top and are suspended in the refrigerator, as shown in Fig. 3. Inside of these cases the ice-boxes $H^2$, filled with water or other fluid to be frozen, are placed; and, in order to effect an immediate contact between the two, the former, $H^1$, are previously partly filled with fluid which does not readily freeze, such as alcohol; or at a higher temperature a solution of chloride of lime might be used. The cases $H^1$ might be employed themselves for freezing purposes by filling them direct with the fluid to be frozen, as such cases are loosely inserted in the openings formed in the cover to receive them, and are packed under their top flanges with India rubber, felt, or other similar material. To insure a complete spreading of the current of air over the whole outer surface of the cases $H^1$ the zigzag or serrated partitions $H^3$ are fixed inside the refrigerator, between each of the metal cases, by which means a zigzag course is given to the current corresponding with the direction of the arrows shown. In the refrigerator the cold air, expanded to atmospheric pressure, enters through the pipe $J^5$, and in passing through imparts its cold to the chest $H^1$, and in a corresponding degree becomes heated itself, and finally escaping through the pipe $J^3$ into the cooler F. In order to maintain a constant pressure inside of the refrigerator, its interior communicates, through the pipe Y, with an expansible chamber exhibited in the form of an elastic ball or balloon, Z, by preference formed of vulcanized India rubber, which immediately becomes distended when the pressure is greater in the refrigerator than that of the atmosphere, and vice versa. Any loss of air inside the refrigerator caused by leakage of any of the parts is compensated for by means of the valve R, which opens inward by atmospheric pressure whenever the pressure inside the refrigerator is less than that of the atmosphere, thus allowing the deficiency to be made up; but before arriving inside the refrigerator such supply, on its way to secure its delivery therein at a very low temperature, should pass through chloride of lime, or its equivalent, placed in an ante-chamber, R R, provided with perforated inner walls, separating it from the interior of the refrigerator. Without the use of such chloride or its equivalent, the air will be chilled nearly if not quite as well by its passage through the perforations in the walls, while they are chilled from contact with the freezing air of the refrigerator.

The refrigerator, constructed as described, is designed specially for freezing liquids; but for cooling air or gases, or condensing vapors, straight or curved pipes may be fixed in such refrigerator in the same manner as the pipes described in the cooler F, which pipes are surrounded with the current of cold air coming from the machine through the pipe $J^3$. Through the straight or curved pipes the air, gases, or vapors to be cooled are conveyed in an opposite direction to the current of air passing outside of them; and in case the machine is required to cool and ventilate apartments, such as cellars, ship-holds, hospitals, theaters, and other places, the cold air is conveyed from the tube $J^5$, which may be lengthened for the purpose directly into such places, while fresh air is constantly supplied to the machine through a pipe in connection with the pipe $J^4$, to be thereby cooled and then forced into such places.

I will now proceed to describe the temperature-regulator.

I have already described the particular manner in which the expanded air passes out of the back part of the cylinder from the compartment $b^1$, through the pipe $J^2$, into the cooler, and through the pipe $J^5$ into the refrigerator. It now, therefore, only remains to be shown more particularly how the cold air is divided so as to pass in the proper quantities through each of the pipes $J^2$ and $J^5$. For this purpose the pipes $J^2$ and $J^5$ each open into a cylindrical compartment, $J^6$, which is fitted with a segmental valve, P, (see Fig. 1,) having the character of a three-way cock. This valve turns with a hand-lever, so that either of the mouths of the pipes $J^2$ and $J^5$ may be partially or entirely closed at pleasure by the hand of the attendant, and the exact relative sizes of such openings is indicated by an index forming part of the hand-lever upon a dial-plate.

The operation of the various parts of the machine having been separately described, I will now describe the course of the air in its circulation through the machine.

During the forward stroke of the piston—that is to say, its movement toward the front cylinder-head $A^1$—the air is compressed in the compressing-chamber 3, and by its pressure caused to open the valve L and pass out through the compartment *a* of the head and through the pipe $J^1$ to the cooler, in which it passes first through the pipes $F^2$, and afterward through the pipes $F^3$, and is thereby cooled. From the cooler the compressed air passes through the pipe J into the compartment $a^1$ of the back cylinder-head $A^2$, whence it passes through the valve O into the expansion-chamber 1 of the cylinder during a portion of the stroke, and until the valve O is closed, after which the air in the latter chamber expands during the remainder of the stroke. During the whole return or back-stroke of the piston, the expanded and cooled air from the expansion-chamber passes out through the open valve N into compartment $b^1$ of the cylinder-head $A^2$, and thence to the temperature-regulator, $J^6$, whence a portion of it passes through the pipe $J^5$ to the refrigerator, and a portion through the pipe $J^2$ into the space surrounding the pipe $F^3$ in the compartment $b^2$ of the cooler. At the same time the air displaced from the refrigerator by the incoming cold air passes out through the pipe $J^3$ into the aforesaid space of the cooler. The air all passes out from this space of the cooler, through the pipe $J^4$, into the compartment *b* of the front cylinder-head, whence it is drawn by the piston, through the inlet-valve M, into the compression-chamber of the cylinder.

It will be readily apparent that instead of the compression and expansion of the air taking place in one and the same cylinder, as in the machine represented, the expansion and compression may take place in two separate cylinders, and that the cooler and refrigerator may be erected some distance from the other parts of the machine, provided that the pipes are arranged in the manner hereinbefore described. The cylinder or cylinders may also be placed in an oblique and vertical instead of a horizontal position, as illustrated, and the air may be admitted into and withdrawn from the expansion-cylinder by means of the ordinary slide-valve used in the steam-engine.

If a less intense degree of cold is required, the air passing round the outsides of the pipes in the cooler may be dispensed with and water be employed instead; or even atmospheric air may be used in place of the water, but passing round the outside of the pipes in the cooler in precisely the same manner as the water.

What is here claimed, and desired to be secured by Letters Patent, is—

1. The process herein described for increasing the intensity of cold produced, the same consisting in returning a part of the compressed air after expansion, so as to cool the air still under compression, as set forth.

2. The combination of the cooler and the temperature-regulator, to operate substantially as herein described.

3. The double-acting cylinder jacketed, and having its covers or heads divided into compartments fitted with valves, organized and operating as herein specified.

4. In combination with the freezing-cells of the refrigerator, the serrated dividing-plates $H^3$, whereby the current of air is impeded and caused to impinge against the sides of the said cells, as and for the purposes specified.

5. In combination with the refrigerating-chamber of an ice-making machine, the expansible chamber Z, connected therewith and operating substantially as described, for the purposes specified.

6. In combination with the refrigerating-chamber of an ice-making machine, the valve R and ante-chamber R-R, provided with perforated inner walls, substantially as described.

7. The air-conducting pipes, located within a cooling-chamber supplied with air at a low temperature, in combination with a compression-pump of an ice-machine, for cooling the compressed air within the pipes, substantially as described.

F. R. WINDHAUSEN.

Witnesses:
B. B. LENDENTT,
S. BAARHS.

(83)